(12) United States Patent  
Rupp

(10) Patent No.: US 11,289,904 B2  
(45) Date of Patent: Mar. 29, 2022

(54) APPARATUS FOR LIMITING VOLTAGE FOR A DC VOLTAGE NETWORK

(71) Applicant: Siemens Aktiengesellschaft, Munich (DE)

(72) Inventor: Jürgen Rupp, Erlangen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 182 days.

(21) Appl. No.: 16/488,683

(22) PCT Filed: Feb. 22, 2018

(86) PCT No.: PCT/EP2018/054399  
§ 371 (c)(1),  
(2) Date: Aug. 26, 2019

(87) PCT Pub. No.: WO2018/153993  
PCT Pub. Date: Aug. 30, 2018

(65) Prior Publication Data  
US 2021/0249854 A1 Aug. 12, 2021

(30) Foreign Application Priority Data  
Feb. 24, 2017 (DE) ...................... 10 2017 203 053.4

(51) Int. Cl.  
*H02H 9/04* (2006.01)  
*G05F 3/22* (2006.01)  
(Continued)

(52) U.S. Cl.  
CPC .............. *H02H 9/041* (2013.01); *G05F 3/22* (2013.01); *H02H 3/16* (2013.01); *H02H 9/02* (2013.01);  
(Continued)

(58) Field of Classification Search  
CPC .. H02H 3/16; H02H 9/00; H02H 3/20; H02H 7/10; H02H 7/122; H02H 7/14;  
(Continued)

(56) References Cited

U.S. PATENT DOCUMENTS 4,475,139 A * 10/1984 Chadwick ............. H02J 3/1864  
    361/91.7  
5,570,260 A * 10/1996 Kanai .................... H02H 3/006  
    361/111  
(Continued)

FOREIGN PATENT DOCUMENTS

CN     101383578 A    3/2009   ............... H02H 7/06  
CN     202997536 U    6/2013   ............... H02H 9/02  
(Continued)

OTHER PUBLICATIONS

Korean Office Action, Application No. 2021027951148, 5 pages, dated Apr. 7, 2021.  
(Continued)

*Primary Examiner* — Danny Nguyen  
(74) *Attorney, Agent, or Firm* — Slayden Grubert Beard PLLC

(57) ABSTRACT

Various embodiments include an apparatus for limiting voltage for a DC voltage network, wherein overvoltages resulting from switching operations occur between a first supply potential level and a second supply potential level of the DC voltage network. The apparatus comprises at least two limiter cells connected in series between the first supply potential level and the second supply potential level. Each limiter cell comprises a controllable switching element, a discharge resistor, and a capacitor, across all of which a voltage applied between the first supply potential level and the second supply potential level is dropped. During operation of the apparatus, based at least in part on the voltage dropped across the respective capacitor of a particular (Continued)

limiter cell, the controllable switching element of the limiter cell is switched on or off.

10 Claims, 3 Drawing Sheets

(51) Int. Cl.
| | |
|---|---|
| *H02H 9/02* | (2006.01) |
| *H02M 1/32* | (2007.01) |
| *H02H 3/16* | (2006.01) |
| H02H 3/20 | (2006.01) |
| H02J 3/36 | (2006.01) |
| H02M 1/00 | (2006.01) |
| H02H 9/00 | (2006.01) |

(52) U.S. Cl.
CPC .............. *H02M 1/32* (2013.01); *H02H 3/20* (2013.01); *H02H 9/00* (2013.01); *H02H 9/04* (2013.01); *H02J 3/36* (2013.01); *H02M 1/00* (2013.01)

(58) Field of Classification Search
CPC ............ H02H 9/04; H02H 9/02; H02H 9/041; H02M 1/00; H02M 11/00; H02M 3/24; H02M 1/32; H02J 3/36; E21B 41/00; G05F 3/22
USPC ................................ 361/91.7, 91.8, 117–120
See application file for complete search history.

(56) References Cited

U.S. PATENT DOCUMENTS

| | | | | |
|---|---|---|---|---|
| 7,072,196 | B1* | 7/2006 | Glidden ................ | H02M 1/096 363/135 |
| 2010/0027177 | A1 | 2/2010 | Huang et al. ................. | 361/91.8 |
| 2011/0188162 | A1 | 8/2011 | Wetter ............................ | 361/57 |
| 2013/0009491 | A1 | 1/2013 | Häfner et al. ................. | 307/113 |
| 2013/0093498 | A1* | 4/2013 | Reshetnyak ......... | H03K 17/125 327/434 |
| 2015/0070802 | A1* | 3/2015 | Dong ........................ | H02J 3/36 361/49 |
| 2017/0133924 | A1 | 5/2017 | Alvarez Valenzuela et al. ........... | 363/56.01 |

FOREIGN PATENT DOCUMENTS

| | | | | |
|---|---|---|---|---|
| CN | 103441530 A | 12/2013 | ................ | H02J 3/38 |
| CN | 203445627 U | 2/2014 | ................ | H02J 3/38 |
| DE | 10 2007 035 329 A1 | 1/2009 | ................ | H02J 7/00 |
| DE | 10 2010 006 525 A1 | 8/2011 | ............... | H02H 9/00 |
| DE | 10 2011 053 013 A | 2/2013 | ............... | H02H 9/04 |
| EP | 2264894 A1 | 12/2010 | ......... | H03K 17/0814 |
| GB | 1 242 673 A | 8/1971 | ............... | H02H 9/04 |
| GB | 2 436 936 A | 10/2007 | ................ | H02J 7/00 |
| JP | 09284110 A | 10/1997 | ............. | H03K 17/08 |
| KR | 20120112734 A | 10/2012 | ............... | H02H 9/02 |
| KR | 20170015965 A | 2/2017 | ............. | H02M 1/32 |

OTHER PUBLICATIONS

Search Report for International Application No. PCT/EP2018/054399, 3 pages, dated Jun. 7, 2018.
Office Action for German Patent Application No. 10 2017 203 053.4, 9 pages, dated Feb. 6, 2018.
Hu, Jinaco, "Application of Crowbar in AC Frequency Converter Drive System for Rolling Mill," Wisco Technology, vol. 47, No. 2, pp. 34-36 (Chinese language w/ English abstract), Apr. 30, 2009.
Xu, Aoran et al., "Application of Crowbar Circuit in the Low-voltage Ride-through of the Wind Power Integration," The New Energy Power Control Technology, vol. 36, No. 5, pp. 51-52 & 102 (Chinese language w/ English abstract), 2014
Xu, Aoran et al., "Study on the Crowbar Circuit in the Lower Voltage Ride Through Technology"; Journal of Shenyang Institute of Engineering (Natural Science), vol. 10, No. 1, pp. 35-37 (Chinese language w/ English abstract), Jan. 31, 2014.
Chinese Office Action, Application No. 201880013359.9, 20 pages, dated Dec. 21, 2020.
Korean Notice of Allowance, Application No. 1020197027706, 2 pages, dated Oct. 14, 2021.

* cited by examiner

US 11,289,904 B2

APPARATUS FOR LIMITING VOLTAGE FOR A DC VOLTAGE NETWORK

CROSS-REFERENCE TO RELATED APPLICATIONS

This application is a U.S. National Stage application of International Application No. PCT/EP2018/054399 filed Feb. 22, 2018, which designates the United States of America, and claims priority to DE Application No. 10 2017 203 053.4 filed Feb. 24, 2017, the contents of which are hereby incorporated by reference in their entirety.

TECHNICAL FIELD

The present disclosure relates to DC voltage networks. Various embodiments may include apparatus for limiting voltage for a DC voltage network.

BACKGROUND

Overvoltages resulting from switching operations in a DC voltage network occur, for example, during the feedback of energy from electrical machines or as a result of switching operations in inductive DC voltage networks. The overvoltages must be limited to prevent damage to the components connected to the DC voltage supply network. In addition to varistors and RC-networks, electronic voltage limiters, so-called brake choppers, are known to be used as surge arresters.

While varistors can absorb high discharge currents very well, they are not suitable for frequently occurring overvoltages, such as arise during switching operations. When subject to frequent energy absorption, varistors tend to age very quickly. The capacitor used in RC networks should be dimensioned depending on the expected overvoltages. If there are large amounts of energy to be absorbed, the capacitor is expensive. In addition, it has a significant size and a significant weight. Brake choppers are used on DC link circuits of converters. The brake choppers are used to dissipate braking energy of the electrical machine connected to the DC voltage supply network.

An example of such a brake chopper, as known from the prior art, is shown in FIG. 1. FIG. 1 shows a DC voltage network 1 with a first supply potential level 2 and a second supply potential level 3. Between the first and second supply potential level 2, 3 a DC-link capacitor 4 is connected. Not shown are a rectifier on the input side and an inverter on the output side. The brake chopper, which has the function of a surge arrester 10, consists of a series circuit of a controllable switching element 11 and a braking resistor 12. The brake chopper or surge arrester 10 is in this case connected in parallel with the DC-link capacitor 4 between the first and second supply potential level 2, 3. The controllable switching element 11 operates as a switch. The resistor 12 is switched into the intermediate circuit in pulsed mode by means of the controllable switching element 11, so that the voltage on the DC-link capacitor 4 is gradually reduced again as a result of the increasing voltage due to a braking operation of the electrical drive. The energy fed back by the electrical machine during the braking operation is thus converted into heat, until the DC-link voltage dropped across the DC-link capacitor 4 falls below a preset turn-off threshold. A corresponding control unit for controlling the controllable switching element 11 is not shown for the sake of simplicity.

If energy needs to be dissipated at a point in the DC voltage network at which there is no capacitance present for smoothing, as is the case in the DC-link shown in FIG. 1, the brake chopper can also be equipped with its own small capacitance. Such a case applies, for example, at the end of a long cable or at the output of a choke in front of a switching element. An example of the latter is shown in FIG. 2. FIG. 2 shows a part of a DC voltage network 1, in which in a conductor of the first supply potential level 2, a choke 5 and a switching element 6 are connected to each other in series. The brake chopper, which forms the surge arrester 10, is connected to the first supply potential level 2 at a node between the choke 5 and the switching element 6. Its other end is connected in a known manner to the second supply potential level 3. The brake chopper or the surge arrester 10 comprises, in addition to the series circuit of the controllable switching element 11 and the resistor 12, a capacitor 13 connected in parallel thereto, which can absorb the current generated by the choke 5 in the phases in which the controllable switching element 11 is switched off. The capacitor 13 in this case is designed only for the energy absorption during the switching-off process of the controllable switching element 11. With the brake chopper described in FIGS. 1 and 2, for higher voltages, in particular of more than 1000 V, the controllable switching elements are either very expensive or not even available.

SUMMARY

The teachings of the present disclosure describe an apparatus for limiting voltage for a DC voltage network, which is improved in its functioning and/or design. For example, some embodiments include an apparatus for limiting voltage for a DC voltage network (1), in which overvoltages resulting from switching operations occur between a first supply potential level (2) and a second supply potential level (3) of the DC voltage network (1), the apparatus (10) comprising at least two limiter cells (10-1, . . . , 10-$n$) which are connected in series between the first supply potential level and the second supply potential level and each of which comprises an arrangement of a controllable switching element (11-1, . . . , 11-$n$), a discharge resistor (12-1, . . . , 12-$n$) and a capacitor (13-1, . . . , 13-$n$), across all of which the voltage ($U_{ges}$) applied between the first supply potential level (2) and the second supply potential level (3) is dropped, wherein during operation of the apparatus, on the basis of the voltage ($U_1, U_2, U_3$) dropped across the capacitor (13-1, . . . , 13-$n$) of a particular limiter cell (10-1, . . . , 10-$n$), the controllable switching element (11-1, . . . , 11-$n$) of said limiter cell is switched on or off.

In some embodiments, in the operation of the apparatus (10) for limiting voltage at a given time the controllable switching element (11-1, . . . , 11-$n$) of that limiter cell (10-1, . . . , 10-$n$), containing the capacitor (13-1, . . . , 13-$n$) across which the highest voltage is applied compared to the voltages of the capacitors (13-1, . . . , 13-$n$) of the rest of the limiter cells (10-1, . . . , 10-$n$), is switched on.

In some embodiments, in the operation of the apparatus the controllable switching elements are operated in pulsed mode.

In some embodiments, in the operation of the apparatus (10) for limiting the voltage at a given time, a first subset of the controllable switching elements (11-1, . . . , 11-$n$) of the at least two limiter cells (10-1, . . . , 10-$n$) is switched on and a second subset of the controllable switching elements (11-1, . . . , 11-$n$) of the at least two limiter cells (10-1, . . . , 10-$n$) is switched off.

In some embodiments, the arrangement comprises a series circuit of the controllable switching element (11-1, . . . , 11-n) and the discharge resistor (12-1, . . . , 12-n) and is connected in parallel with the series circuit of the capacitors (13-1, . . . , 13-n).

In some embodiments, the controllable switching element (11-1, . . . , 11-n) is an IGBT.

In some embodiments, the series circuit additionally comprises an inductor (14-1, . . . , 14-n).

In some embodiments, the controllable switching element (11-1, . . . , 11-n) is a thyristor.

In some embodiments, the controllable switching element (11-1, . . . , 11-n) is a GTO, or the thyristor is provided with a quenching circuit.

In some embodiments, the size of the inductor (14-1, . . . , 14-n) is chosen depending on the size of the capacitor (13-1, . . . , 13-n) and/or on the discharge resistor (12-1, . . . , 12-n), in such a way that an RLC resonant circuit is formed.

In some embodiments, the number of the limiter cells (10-1, . . . , 10-n) is greater than 2.

In some embodiments, said apparatus comprises a control unit for controlling the respective switching elements (11-1, . . . , 11-n) of the limiter cells (10-1, . . . , 10-n).

In some embodiments, the nominal voltage potential between the first supply potential level (2) and the second supply potential level (3) of the DC voltage network (1) is greater than 1000 V.

BRIEF DESCRIPTION OF THE DRAWINGS

The teachings herein are described in more detail in the following on the basis of exemplary embodiments in the drawing. Shown are.

In the figures, equivalent elements are labelled with the same reference numerals.

DETAILED DESCRIPTION

Figure 1:
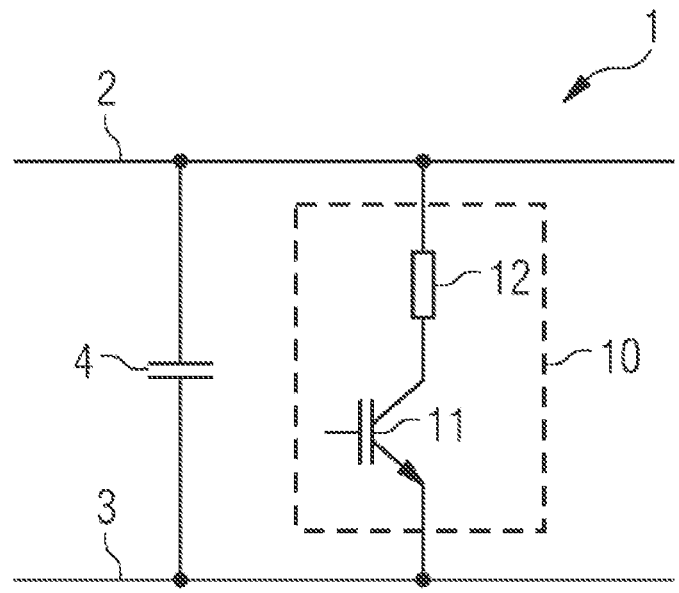
FIG. 1 a schematic representation of a known DC-link circuit of a DC voltage network, with an apparatus for limiting voltage designed as a brake chopper.
Figure 2:
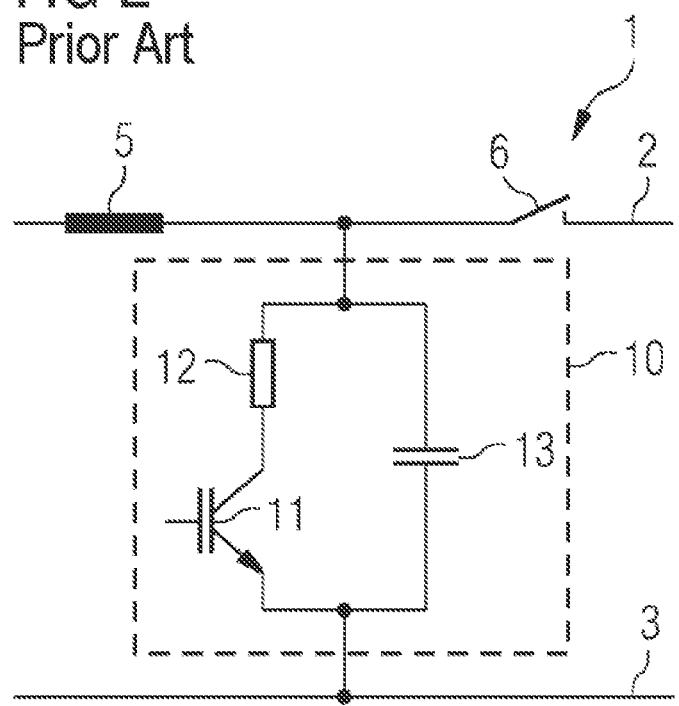
FIG. 2 a schematic representation of a known brake chopper at the output of a choke in front of a switching element.

Some embodiments include an apparatus for limiting voltage for a DC voltage network, in which between a first supply potential level and a second supply potential level of the DC voltage network overvoltages can occur as a result of switching operations. The apparatus comprises at least two limiter cells interconnected in series between the first supply potential level and the second supply potential level. Each of the limiter cells comprises an arrangement of a controllable switching element, a discharge resistor and a capacitor. The (total) voltage applied between the first supply potential level and the second supply potential is dropped across the at least two limiter cells. In the operation of the apparatus, depending on the voltage dropped across the capacitor of a respective limiter cell, the controllable switching element thereof is switched on or off.

Some embodiments are designed in a modular fashion from a plurality of limiter cells which are interconnected in a series circuit between the first and the second supply potential level. By means of the series connection of a plurality of limiter cells, only a partial voltage is dropped across the switched-off controllable switching elements, so that controllable switching elements of low voltage compared to a single limiter cell can be used. This allows less expensive controllable switching elements to be chosen. Due to the presence of the capacitor in each limiter cell, the voltage on the respective controllable switching element of the limiter cell cannot change abruptly. As a result, a balancing or a precise temporal control of the individual controllable switching elements of the limiter cells, is not time critical.

The maximum voltage dropped across each of the limiter cells can be regulated independently of the others. This means that a higher-level control unit is not necessary, although it is possible. The latter is expedient, for example, if the voltage that occurs between the first and the second supply potential level needs to be set to a variable level.

In some embodiments, in the operation of the apparatus for limiting voltage at a given time the controllable switching element of that limiter cell containing the capacitor across which the highest voltage is applied compared to the voltages of the capacitors of the rest of the limiter cells, is switched on. In other words, the voltages across the capacitors of all limiter cells are determined separately and compared with each other. The switching element of that limiter cell containing the capacitor across which the highest voltage is dropped, is then switched on. This ensures that no overloading of the controllable switching element of a respective limiter cell can occur, even at high overvoltages.

In some embodiments, in the operation of the apparatus the controllable switching elements are operated in pulsed mode. This means that the respective limiter elements, as is the case in a conventional brake chopper, are operated in a pulsed mode ("chopped up"), in order to lower the voltage between the first and second supply potential level gradually. It is possible, in particular, to use known control units of conventional brake choppers for the apparatus for voltage reduction proposed according to the invention.

In some embodiments, in the operation of the apparatus for limiting voltage, at a given time a first subset of the controllable switching elements of the at least two limiter cells is switched on and a second subset of the controllable switching elements of the at least two limiter cells is switched off. In such a design it is ensured that, even in the event of a short-circuit in which a maximum discharge current must be handled, the simultaneous activation of all limiter cells (i.e., the simultaneous activation of the respective controllable switching elements of all limiter cells) is possible. This can, in particular, ensure that even in the event of a short-circuit and the resulting high discharge current, no damage can occur to the components of the limiter cells.

In some embodiments, the arrangement comprises a series circuit of the controllable switching and the discharge resistor, and the capacitor is connected in parallel with the series circuit. In such a configuration, the controllable switching element can be an IGBT (Insulated Gate Bipolar Transistor).

In some embodiments, the series circuit can comprise an inductor in addition to the controllable switching element and the discharge resistor. The size of the inductor may be chosen depending on the size of the capacitor and/or of the discharge resistor, in such a way that an RLC resonant circuit is formed by each limiter cell. This makes it possible to select a thyristor as the controllable switching element, because by means of the RLC resonant circuit an automatic blocking, i.e., switching off, of the thyristor is possible. A simplified control is obtained when the controllable switching element is designed as a GTO (gate turn-off thyristor) or the thyristor is provided with a quenching circuit.

In some embodiments, the number of limiter cells is more than two. The exact number of limiter cells depends on the nominal voltage between the first and second supply potential levels, and on the voltage breakdown strength class of the controllable switching element used in the respective limiter cells. In principle, the functionality is already guaranteed if two limiter cells are connected in series one after the other between the first and second supply potential level.

In some embodiments, the apparatus for limiting voltage comprises a control unit for controlling the respective switching elements of the limiter cells. As already explained above, the control unit can be designed such that this performs a higher-level coordination of the temporal switch-on and switch-off behavior of the controllable switching elements of the different limiter cells. The control unit can, however, also be designed in such a way that this performs the control of the controllable switching elements depending exclusively on the voltage applied across the capacitors of the limiter cells.

In some embodiments, the nominal voltage between the first supply potential level and the second supply potential level of the DC voltage network is greater than 1000 V. In other words, this means that the apparatus for limiting voltage is provided in particular in medium-voltage networks, such as are used, for example, for ships or in industrial plants.

Figure 3:
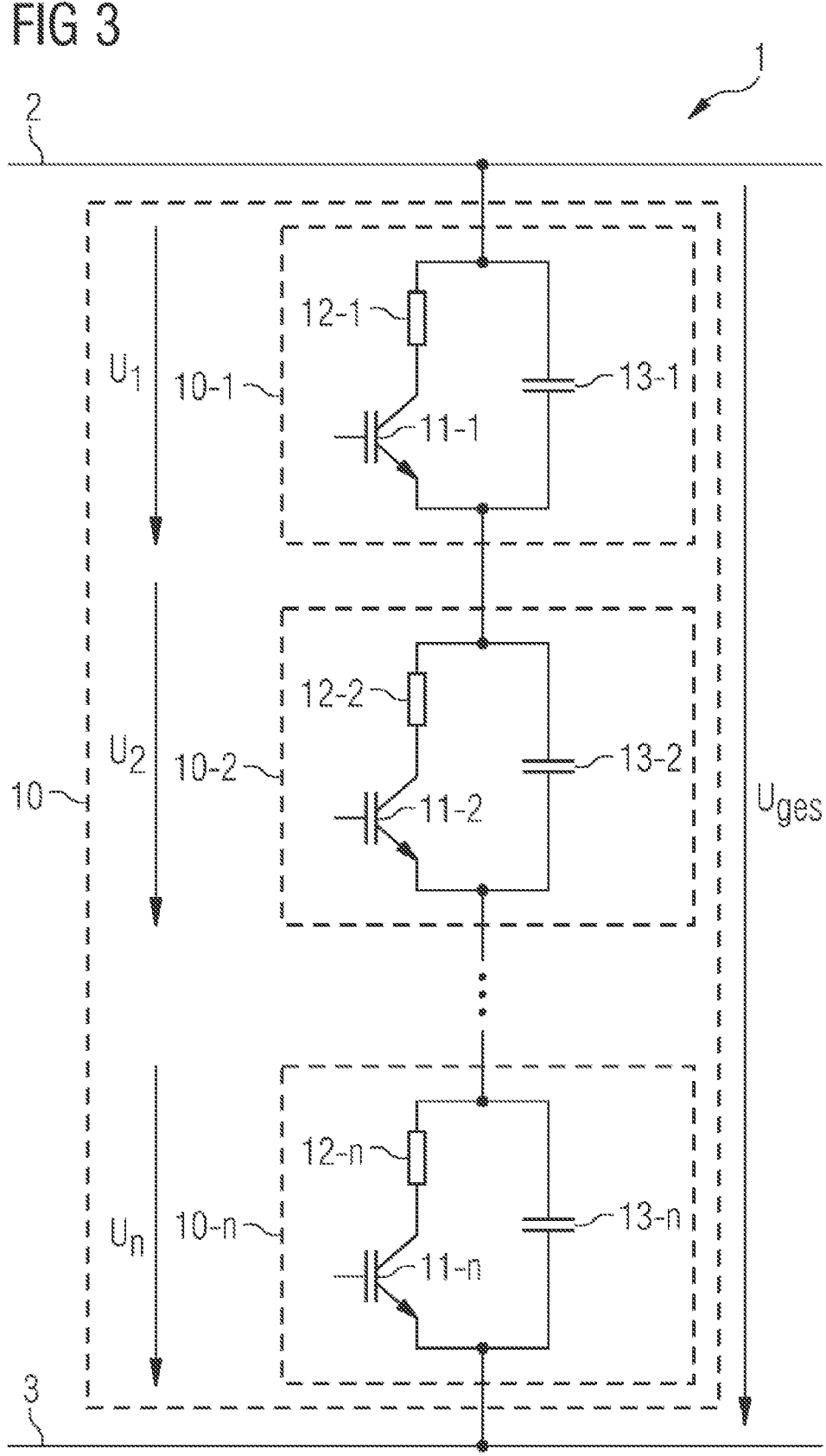
FIG. 3 shows a schematic representation of a first embodiment of an apparatus for limiting voltage incorporating teachings of the present disclosure for a DC voltage network.

FIG. 3 shows a schematic representation of a part of a DC voltage network 1, of which one conductor of a first supply potential level 2 and one conductor of a second supply potential level 3 are shown. Between the conductors of the first and second supply potential level 2, 3 an apparatus 10 for limiting voltage according to the invention (hereafter referred to as a voltage limiter or surge arrester) is connected. The surge arrester 10 comprises a number n of limiter cells 10-1, ..., 10-n serially connected between the first and second supply potential level 2, 3. The number n in the present case is two or more. The number of limiter cells 10-1, ..., 10-n is identically designed in each case and comprises in each case an arrangement consisting of a controllable switching element 11-i, a discharge resistor 12-i and a capacitor 13-i, where i=1 to n. In each of the limiter cells 10-i the controllable switching element 11-i and the discharge resistor 12-i are serially connected to each other. Connected in parallel with this series circuit of the controllable switching element 11-i and the discharge resistor 12-i is the capacitor 13-i.

The node between the discharge resistor 12-1 and the capacitor 13-1 of the first limiter cell 10-1 is connected to the conductor of the first supply potential level 2. The node between a load terminal of the controllable switching element 11-1 and the capacitor 13-1 of the first limiter cell 10-1 is connected to the node of the discharge resistor 12-2 and capacitor 13-2 of the directly following second limiter cell 10-2. The node of the last limiter cell 10-n between the main terminal of the controllable switching element 11-n and the capacitor 13-n is connected to the conductor of the second supply potential level 3. In the limiter cells 10-i, IGBTs are provided as controllable switching elements 11-i. The control terminals of the IGBTs are connected to a control unit, not shown.

A total voltage dropped between the conductors of the first and second supply potential level 2, 3 $U_{ges}$ is divided according to the number n of the limiter cells into partial voltages $U_1, \ldots, U_n$, wherein each partial voltage $U_i$ is dropped across the respective limiter cells 10-i.

In the event of an overvoltage occurring between the conductors of the first and second supply potential level 2, 3 this overvoltage is gradually dissipated by means of the apparatus 10 for limiting voltage. For this purpose, the controllable switching elements 11-i of the limiter cells 10-i are operated in pulsed mode with a time offset. According to the operation of a brake chopper, in each controllable switching element 11-i which is switched on, current is passed through the associated discharge resistor 12-i and converted into heat. If the relevant controllable switching element 11-i is switched off, this is followed by a voltage buffering via the associated capacitor 13-i of the respective limiter cell 10-i, since the current can now flow into the capacitor 13-i.

The series circuit of the limiter cells and the topology of the arrangements of the limiter cells ensures that in each limiter cell the voltage on the individual IGBT cannot change abruptly and therefore a balancing operation, i.e. a temporal synchronization of the switching on and switching off behavior of the controllable switching elements 13-i of all limiter cells 10-i, is not required. This is made possible by means of the capacitor provided in each of the limiter cells 10-i.

The individual limiter cells can regulate their maximum voltage independently of one another, with no higher-level coordination by the control unit being required for controlling the controllable switching elements 11-i. The higher-level coordination is possible, however, for example, if a variable total voltage $U_{ges}$ is to be set.

In some embodiments, IGBTs of low voltage classes, i.e. up to 1200 V, can be used as controllable switching elements, assuming a nominal total voltage $U_{ges}$ which is greater than 1000 V. The series connection of the capacitances of the capacitors 13-i in the limiter cells 10-i can, if appropriate, be in parallel with a DC-link capacitor connected between the conductors of the first and second supply potential level 2, 3. As a result, the capacitances of the capacitors 13-i can at least partially replace the function of the DC-link capacitor, so that the DC-link capacitor may be dimensioned smaller. In such a configuration, as is schematically illustrated in FIG. 1, the DC-link capacitor and the apparatus 10 for limiting voltage can then be considered as a unit.

When using IGBTs as controllable switching elements 11-i it is important to take into account the fact that, in the event of a fault such as a short circuit, these can be overloaded by no more than two to three times the rated current. The design or the choice of the number n of the limiter cells 10-i is therefore preferably made in such a way that in order to dissipate the overvoltages occurring in the DC voltage network at a given time during switching operations, not all controllable switching elements 11-i of all limiter cells 10-i need to be switched to the conductive state. If the apparatus 10 for limiting voltage comprises, for example, n=2 limiter cells, then at a given time the controllable switching element of one of the cells is switched on and the controllable switching element of the other limiter cell is switched off. For a large number n of limiter cells 10; a different partitioning can be selected. The IGBTs are switched on and off in such a way that the IGBT of a limiter cell 10-i containing the capacitor 13-i across which the highest voltage is applied compared to the voltages of the other capacitors of the rest of the limiter cells 10-i, is switched on. This results automatically and incidentally in a pulsed switching of respective controllable switching elements 11-$i$ on and off.

In the event of a short-circuit, in which a maximum discharge current can occur, all of the controllable switching elements or IGBTs 11-$i$ are then switched on at the same time. This allows the voltage overshoot to be dissipated as quickly as possible, without causing damage to the switching elements.

Figure 4:
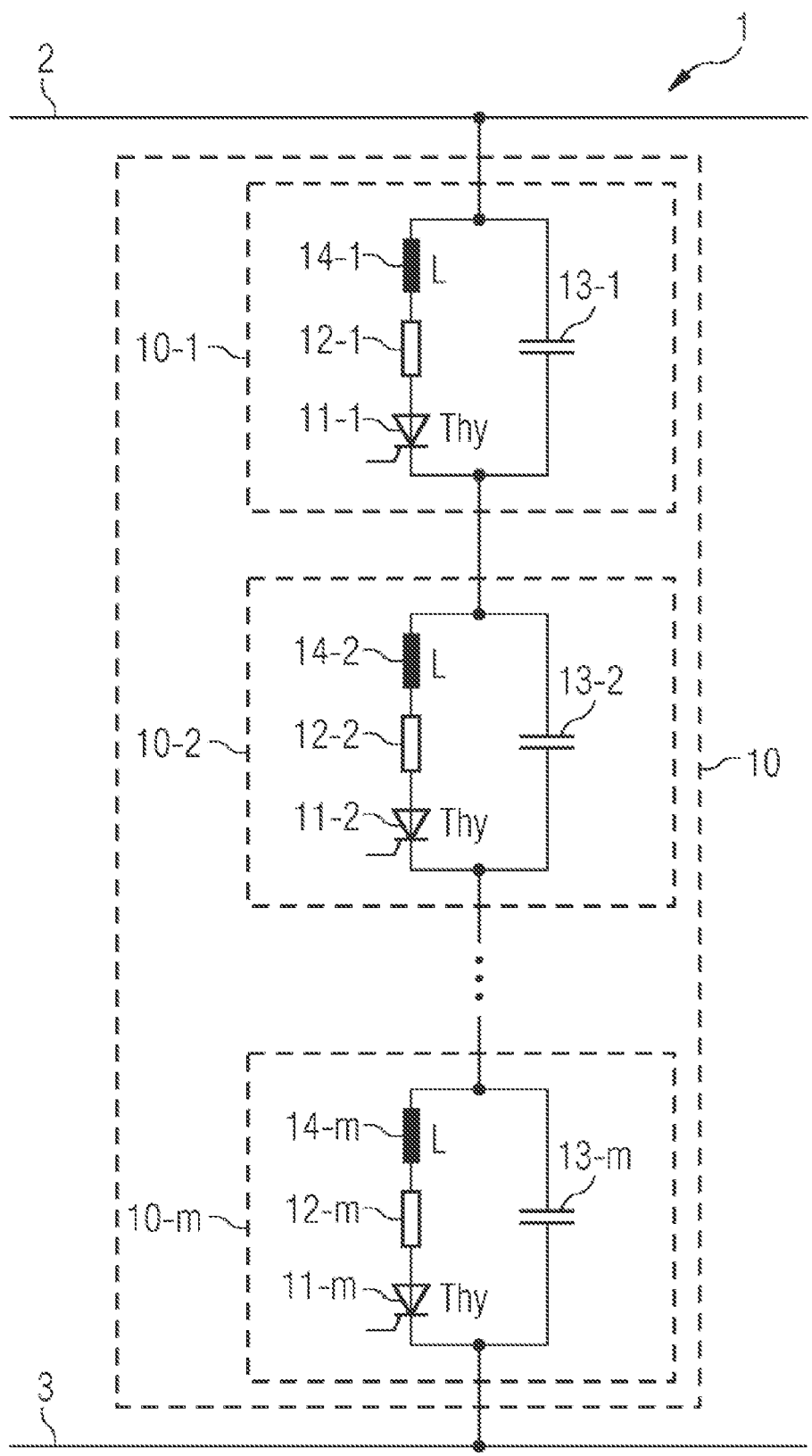
FIG. 4 shows a schematic representation of a second embodiment of an apparatus for limiting voltage incorporating teachings of the present disclosure.

To handle higher voltages and higher power levels, thyristors can also be used as controllable switching elements. Such an exemplary embodiment of an apparatus 10 according to the invention for limiting voltage is shown schematically in FIG. 4. Thyristors have the advantage over IGBTs that the former can withstand 10 to 20 times the rated current without being destroyed. As thyristors cannot be (readily) switched off, a fine-grained regulation of the voltage is not possible without additional measures. By means of the sufficient serial connection of m limiter cells (where m is preferably greater than n in the exemplary embodiment according to FIG. 3), however, the voltage swing is still small even if a single limiter cell is completely discharged when the thyristors are firing.

When thyristors are provided as controllable switching elements 11-$i$ (where i=1 to m), an inductor 14-$i$ is provided in addition to the serial interconnection of the controllable switching elements 11-$i$ and the discharge resistor 12-$i$. The size of the inductor 14-$i$ of each limiter cell 10-$i$ is chosen depending on the size of the capacitance of the capacitor 13-$i$ and the resistance of the discharge resistor 12-$i$. As a result, an RLC resonant circuit is then formed in each limiter cell 10-$i$. This means that within a limiter cell 10-$i$ a zero current is generated to quench the respective thyristor 11-$i$ after a complete discharge of the capacitor 13-$i$. A self-quenching of the thyristor is thereby possible.

The number m of the limiter cells 10-$i$ when thyristors are used is at least m=3. With only two limiter cells, i.e. m=2, each capacitor 13-$i$ would need to absorb the total voltage $U_{ges}$ that occurs between the first and the second supply potential level 2, 3, under the assumption that not all thyristors of all limiter elements are switched on at the same time.

In the practical implementation m=20 could be selected as the number, wherein at a given time, e.g., three thyristors of three different limiter cells would be switched on. This over-dimensioning is advantageous because a symmetrical voltage distribution over the respective limiter elements 10-$i$ is not possible in this configuration.

What is claimed is:

1. An apparatus for limiting voltage for a DC voltage network, wherein overvoltages resulting from switching operations occur between a first supply potential level and a second supply potential level of the DC voltage network, the apparatus comprising:

at least two limiter cells connected in series between the first supply potential level and the second supply potential level;

wherein each limiter cell comprises a controllable switching element, a discharge resistor, and a capacitor, across all of which a voltage applied between the first supply potential level and the second supply potential level is dropped;

wherein during operation of the apparatus, based at least in part on the voltage dropped across the respective capacitor of a particular limiter cell, the controllable switching element of the limiter cell is switched on or off;

wherein a respective controllable switching element and a respective discharge resistor are connected in series with one another and an inductor in a respective series circuit;

wherein each series circuit is in parallel with the respective capacitor; and wherein a size of the inductor depends on a size of the capacitor and/or the discharge resistor to form an RLC resonant circuit.

2. The apparatus as claimed in claim 1, wherein, during operation of the apparatus at a given time, the respective controllable switching element of the particular limiter cell containing the respective capacitor with the highest applied voltage in comparison to voltages of the other capacitors is switched on.

3. The apparatus as claimed in claim 1, wherein, during operation of the apparatus, the controllable switching elements are operated in pulsed mode.

4. The apparatus as claimed in claim 1, wherein during operation of the apparatus at a given time, a first subset of the respective controllable switching elements is switched on and a second subset of the controllable switching elements is switched off.

5. The apparatus as claimed in claim 1, wherein the controllable switching element comprises an IGBT.

6. The apparatus as claimed in claim 1, wherein the controllable switching element comprises a thyristor.

7. The apparatus as claimed in claim 6, wherein the controllable switching element comprises a GTO or the thyristor includes a quenching circuit.

8. The apparatus as claimed in claim 1, wherein a number of the limiter cells is greater than 2.

9. The apparatus as claimed in claim 1, further comprising a control unit for controlling the respective switching elements.

10. The apparatus as claimed in claim 1, wherein a nominal voltage potential between the first supply potential level and the second supply potential level is greater than 1000 V.

* * * * *